(12) United States Patent
Mabey

(10) Patent No.: US 7,744,693 B2
(45) Date of Patent: Jun. 29, 2010

(54) LIGHTWEIGHT COMPOSITE MATERIALS AND METHODS

(76) Inventor: Michael John Mabey, 44 Bethel Drive, Sherwood Park, AB (CA) T8H 2G1

(*) Notice: Subject to any disclaimer, the term of this patent is extended or adjusted under 35 U.S.C. 154(b) by 1399 days.

(21) Appl. No.: 11/093,006

(22) Filed: Mar. 29, 2005

(65) Prior Publication Data

US 2005/0252419 A1    Nov. 17, 2005

(30) Foreign Application Priority Data

Mar. 30, 2004   (CA)   .................................... 2462546

(51) Int. Cl.
  *C04B 9/00*   (2006.01)

(52) U.S. Cl. ........................ 106/801; 106/672; 106/673; 106/685; 106/803

(58) Field of Classification Search ................ 106/672, 106/673, 690, 691, 685, 801, 803
See application file for complete search history.

(56) References Cited

U.S. PATENT DOCUMENTS

| | | | |
|---|---|---|---|
| 3,960,580 A | 6/1976 | Stierli et al. ................... 106/58 |
| 4,355,060 A | 10/1982 | Cornwell ..................... 427/427 |
| 4,596,834 A * | 6/1986 | Widener et al. | |
| 4,756,762 A * | 7/1988 | Weill et al. ................... 106/691 |
| 4,786,328 A * | 11/1988 | Weill et al. ................... 106/691 |
| 5,002,610 A | 3/1991 | Sherif et al. ................. 106/691 |
| 5,645,518 A | 7/1997 | Wagh et al. .................. 588/252 |
| 5,830,815 A | 11/1998 | Wagh et al. .................. 501/155 |
| 5,846,894 A | 12/1998 | Singh et al. .................. 501/155 |
| 6,010,565 A * | 1/2000 | Bastian et al. .............. 106/122 |
| 6,133,498 A | 10/2000 | Singh et al. ..................... 588/3 |
| 6,136,088 A | 10/2000 | Farrington ................... 106/691 |

OTHER PUBLICATIONS

Hawley's Condensed Chemical Dictionary (Lewis) 12th edition, 1993 p. 863, definition of latex.*
EP 0866039 abstract (Sep. 1998), Europe Moraitis.*
Mabey, "Lightweight 'Mineral Foam' Composite Materials and Methods of Making and Using Such Composite Materials," Canadian patent application serial No. 2,462,546 filed on Mar. 30, 2004 A.D.
U.S. Dept. of Transportation, Turner-Fairbank Hwy. Res Center, home and Quarry By-Products, Flowable Fill & Material Description pages (www.tfhrc.gov) downloaded Jan. 19, 2009.
U.S. Silica Company, data pages from CISA link (www.cisa.org/members/us_silica.htm) downloaded Jan. 21, 2009.

(Continued)

*Primary Examiner*—Paul Marcantoni
(74) *Attorney, Agent, or Firm*—Christopher John Rudy

(57) ABSTRACT

Lightweight composite or "mineral foam" composite materials can be made from reactive materials such as metal oxides. The materials can be prepared from a reaction of metal oxide(s), phosphate(s) and residual materials to which may be added a reactive foaming agent and/or latex polymer to provide enhanced physical properties. The composite materials can have a density of between about 0.35 to 2.25 g/cc, and may be used for many applications including precast structures, in-situ structures, insulating blocks, slabs and composite wall sections, light weight spheres, mixes and coatings.

20 Claims, 3 Drawing Sheets

OTHER PUBLICATIONS

Harrison et al., "Coal Fines: Resource of the Future," 1997 (www.netl.doe.gov/publications/proceedings/97/97cl/harrison.pdf) downloaded Jan. 19-21, 2009.

Olde World Stone and Tile Molds, Concrete Mix for Making Man Made Stone and Tile Using Portland Cement (www.themoldstore.info/Portland_Mixes.html) downloaded Jan. 21, 2009.

* cited by examiner

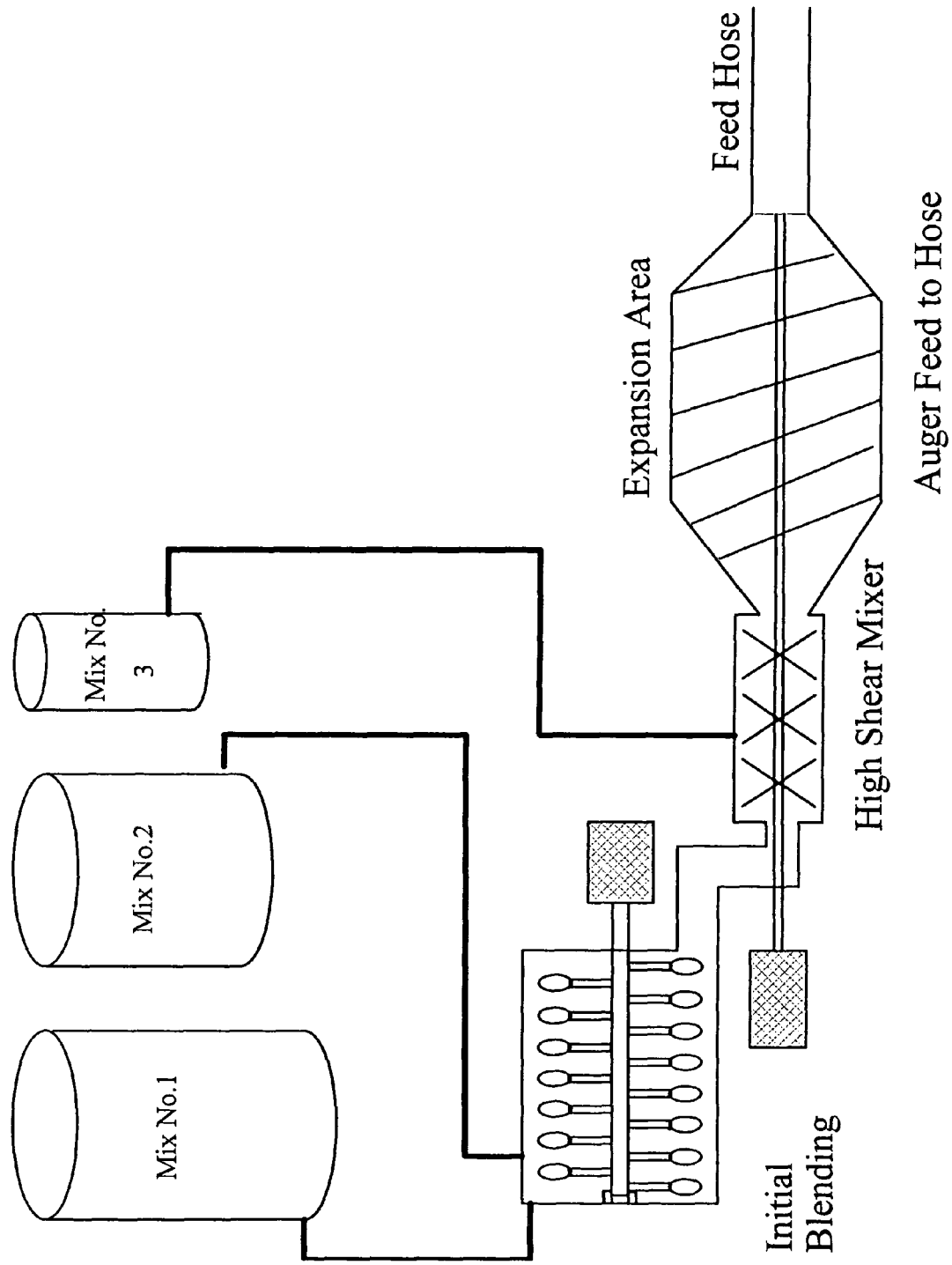
Figure No.1

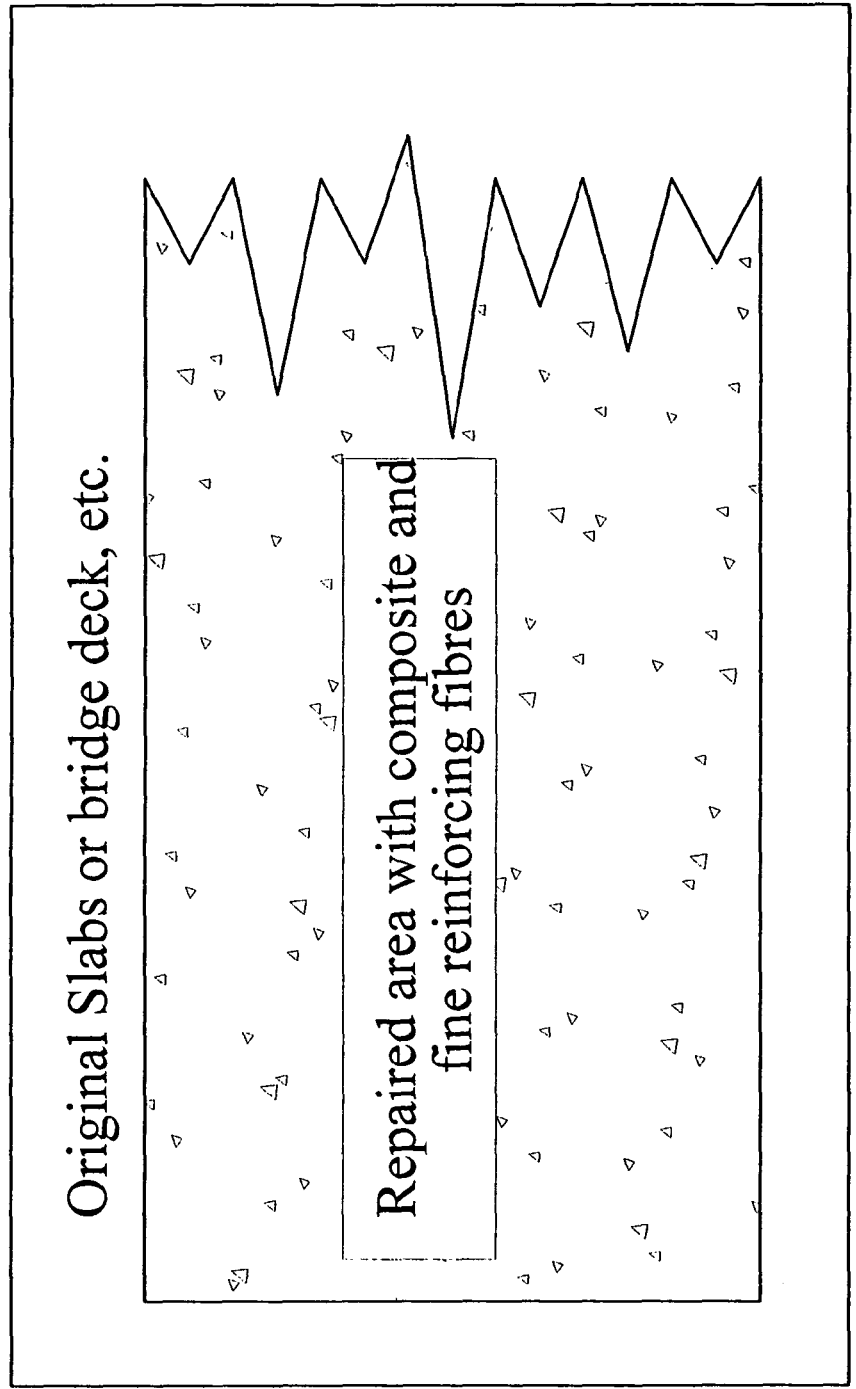
Figure No. 2
Concrete Repair or Acid Resistant Overlay Compound

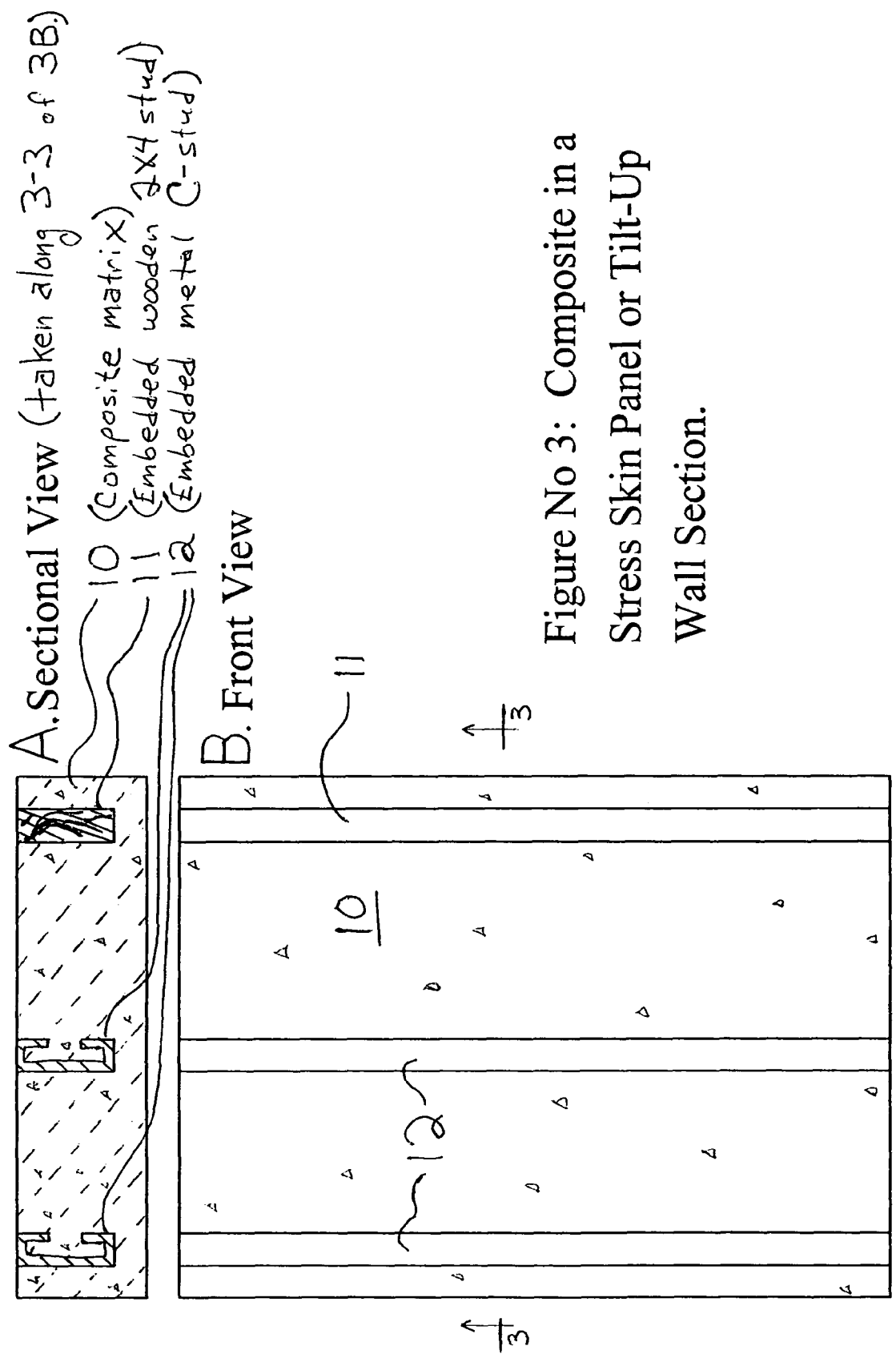
Figure No 3: Composite in a Stress Skin Panel or Tilt-Up Wall Section.

LIGHTWEIGHT COMPOSITE MATERIALS AND METHODS

Priority benefit is claimed of Canadian patent application No. 2,462,546 filed on Mar. 30, 2004 A.D.

FIELD OF THE INVENTION

This invention generally concerns composite materials, more particularly light weight composite materials, which may be foamed, and may be made from reactive compounds such as alkaline earth metal oxides, phosphates, and residual materials and, optionally, suitable foaming agents, and methods of making and using such composites.

BACKGROUND TO THE INVENTION

Typical concrete materials are made of Portland cement, sand, stone and water. When water is mixed with Portland cement, an exothermic reaction occurs, which results in a solid mass with a density approximating 145 pounds per cubic foot.

Although conventional concrete is useful for many applications, and has a long history of use, lighter weight mixes such as "autoclaved aerated concrete" (AAC) are known to have considerably lighter density than conventional concrete and also exhibit some insulating properties as well. These AAC products are limited owing to the high cost of equipment, and lengthy processing cycles. Portland cement, in fact, while widely used in many lighter weight construction applications, requires care in handling since any changes in temperature, vibration or disturbance can cause the fine cellular structure to collapse before the materials have set sufficiently to be self-supporting. Also, Portland-based cellular concretes at low densities tend to be very friable and are easily damaged, and exhibit very low compressive strength unless exposed to curing procedures common to AAC. This AAC process is time consuming, with 12 hour cycles; capital intensive, with autoclaves involved, and energy intensive, with 10 hours under steam and pressure.

Phosphate-containing concretes have been proposed for a number of purposes. For example, U.S. Pat. No. 3,960,580 describes use of oxy-boron compounds as retarders in acid-base cements containing magnesium oxide and various grades of powdered phosphate compounds. U.S. Pat. No. 4,335,060 describes an acid-base cement comprising "liquid ammonium polyphosphates" with fly ash and magnesium oxide where the fly ash can be used as a substitute for part or all of the MgO. Further references to acid-base cements include those found in U.S. Pat. Nos. 5,645,518; 5,830,815; 5,846,894 and 6,133,498, which disclose phosphate ceramics that encapsulate various types of residual materials and contaminants such as heavy metals, asbestos, ash, various wastes, and low-level radioactive waste. These patents teach the use of residual materials that act as fill materials, which are encapsulated and do not participate in the chemical reaction of the product. Such processes use high-purity reagent grade phosphates and dead burned MgO. These processes utilize expensive MKP, i.e., mono-potassium phosphate, which reacts with the $P_2O_4$ to produce high sensitivity matrices— but tend to be too expensive—when compared to the use of MAP, i.e., mono-ammonium phosphate, as an acid source. These products tend to be lighter than Portland cement concretes, but form dense matrices that are ineffective for use as insulating materials, and are not generally used in applications where a light weight insulating material would be advantageous. U.S. Pat. No. 5,002,610 discusses use of fibre additives to magnesium phosphate cements and non-reactive fill materials to achieve mechanical properties desirable for construction uses similar to those of Portland cement-based concrete. U.S. Pat. No. 6,136,088 discloses production of a cement and/or mortar based on reactions of water, magnesium compounds, and potassium phosphate, which utilize retardants such as boron oxide, polyphosphonic acid, carboxylic acid, hydrocarboxylic acid, and salts of these acids; additives such as silica, class F fly ash, talc, clay based sand, silica fume, and mixtures of these materials are used as inert fillers; these composites are dense and have high compressive strengths.

While the prior art covers numerous applications and uses for these acid/base cements, often referred to as "Sorrell Cements," they all create a fairly high density, solid matrix with very high compressive strengths and very low permeability. They tend to be too heavy to be considered in applications where lightweight and low thermal conductivity are crucial to the success of the intended purposes.

It is, therefore, desirable to improve the art. It is, furthermore, more particularly desirable to provide materials that address such deficiencies of the prior art as relate to thermal conductivity and overall density, cost of raw materials, and issues and shortcomings characteristic with these prior inventions. It is also desirable to provide improved compositions efficiently, and to have generally widespread use for them.

A SUMMARY OF THE INVENTION

In general, the present invention provides a lightweight composite material, and methods of making and using it. Generally, certain composite materials of the present invention can have densities less than those of conventional concrete materials, and enhanced resistance to moisture penetration and acid attack. The composite may also find advantage as an alternate to hydrocarbon based "foamed plastic" insulation as a fire resistant alternative where this attribute would find favor in the building industry. Among embodiments, in general, the lightweight composite material may be found as a "mineral foam," or as a moisture resistant, light weight composite coating or lining. The composite materials, for illustrative example, can have a density of between about 0.35 to 2.25 g/cc.

The present materials can be made from reactive compounds, for example, alkaline earth metal oxides and phosphates, optionally with generation of fine gas bubbles inside the materials under production, which results in an inherently light weight product with excellent insulation properties, as compared to products found in the prior art. The materials can be made by mixing chemically active components, with or without relatively low cost waste or residual materials, with liquid and a foaming agent and specialty latex polymers, resulting in a lighter weight product with the stated, desired properties for a particular application.

The invention is useful in insulation materials and construction technology.

Numerous advantages attend the invention.

BRIEF DESCRIPTION OF THE DRAWINGS

The drawings form part of the specification hereof. With respect to the drawings, which are not necessarily drawn to scale, the following is briefly noted:

FIG. 1 is a schematic diagram illustrating a process of making a composite material in accordance with an embodiment of the present invention.

FIG. 2 is an illustration of a composite material of the invention, employed as a concrete repair or acid resistant overlay composite.

FIG. 3 is an illustration of a composite material of the invention, employed as a lightweight building product.

FURTHER DETAIL ILLUSTRATIVE OF THE INVENTION

The invention can be further understood by the present detail, which may be read in view of the drawings. As with the foregoing disclosures of the invention, such is to be taken in an illustrative and not necessarily limiting sense.

Provided hereby can be a lightweight composite material and its production. In accordance with one embodiment of the invention, alkaline earth metal oxide mineral foam compounds are formed with desired characteristics by reacting acid-based metal/phosphate compounds with water, and a foaming agent. Control of the reaction may be achieved by varying the ratios of metal (ion), phosphates, the particle size of the compounds, the surface area of the components, the amount of water, the purity of the compounds and the oxide reactivity rate. The workability, set time and compressive strength and density of the resulting composite mineral foam may be optimized by controlling the reactivity of metal/phosphate compounds and the ratios of the various ingredients in the final mix, or by adding compounds that are known to retard the acid/base cement reactions, such as boron, borates and the like.

One provision of the invention is a lighter weight composite material comprising a reaction product of alkaline earth metal oxides, phosphate, reactive residual material and water and, optionally, suitable foaming agent(s). Suitable foaming agents include hydrogen peroxide ($H_2O_2$); carbonic acid, monosodium salt ($NaHCO_3$); and/or potassium carbonate ($K_3CO_3$); or any other oxide or carbonate that will produce gas when exposed to water and the other ingredient(s) employed in the practice of the invention. Another provision is a lightweight, non-combustible mineral foam material comprising a reaction product of metal oxide, phosphate, reactive residual material, a foaming agent, and water. Another provision of the invention is a mix for making a composite material comprising metal oxide, phosphate and reactive residual material. Alternatively, the mix may comprise a magnesium-containing material, phosphate, and reactive residual material. As a further provision, the mix may comprise metal oxide and/or magnesium-containing material and/or phosphate, wherein at least a portion of one or more of these materials is provided from a reactive residual and/or waste material. As a further provision, the mix may comprise metal oxide and/or magnesium-containing material and/or phosphate, wherein the mix is further extended by the addition of other, non-reactive fillers or residual and/or waste material, such as fly ash, mine tailings, silica fines, agricultural fibres, metal slurries, shavings and any combination of same.

A further aspect of the invention is to provide a method of making a lightweight, non-combustible mineral foam composite material. The method comprises contacting a metal oxide, phosphate and/or reactive residual material with water, and/or fillers and/or a foaming agent, under conditions such that the composite material is made. The method can include reaction of a mixture of the metal oxide, phosphate and/or reactive residual material with water and/or fillers, and introduction of the foaming agent at a time just prior to the materials initial set. As a further alternative, the method can comprise reacting a magnesium-containing material and phosphate, wherein at least one of the magnesium-containing material and phosphate is provided from a reactive residual material. As a further alternative, the method can comprise reacting a magnesium-containing material and phosphate, and a latex polymer, wherein at least one of the magnesium-containing material and phosphate is provided from a reactive residual material. Reaction may be initiated by adding water to the mixture of essentially dry starting materials and incorporating a suitable foaming agent into the wet mixture.

Potential end uses for the finished product may include the following: As a coating, the product of this invention has demonstrated a high degree of resistance to acidic environments. As such, the wet mixture may be applied by spray, trowel or other suitable methods to the interior of concrete pipe or other containment structures used in the typical sewage system or chemical process/storage situations to repair corroded concrete pipe which has suffered from degradation from hydrogen sulphide ($H_2S$) or other corrosive gases and liquids in human sewage or chemically sensitive structure, which attacks concrete (Portland cement) and breaks down the concrete matrix. The application of the present materials could repair these pipes and structures, including concrete floors, and further delay damage to them by providing an acid resistant layer or coating. A further embodiment of this same application may include the manufacture of an acid resistant collar or lining that may be installed in a new pipe, storage vessel, concrete tank, etc., to add value and corrosion resistance, before being placed in service.

As a lighter weight "concrete," the product of this invention when mixed and set can be designed to have a more moderate density of between 0.75 to 2.2 g/cc depending on the filler(s) or aggregate(s) used in the mix. At this density, which can be achieved without adding the foaming agents mentioned earlier, the product could be formed into spheres or granules of various sizes which might be mixed with drilling fluids and used in an oil field application to assist in improving the flow of oil or gas from new or partially spent wells. In such an embodiment, these light weight spheres or grains would be pumped with the drilling mud into the rock strata and serve to separate layers of rock or shale to cause an increase in the flow rate of liquids or gases. An advantage of the lighter weight spheres or granules would be that they would tend to stay in suspension longer than heavier aggregates such as zirconium and other higher weight ceramic spheres or natural sand, and would thus travel further under pumping pressure into the rock structure without settling out and/or clogging up as sometimes otherwise occurs with many heavier media used in these applications.

In many applications, where abrasion resistance, adhesion, and flexural strength are needed in the finished composite, the potential exists to include a compatible (salt stable) latex polymer into the wet slurry to replace part of the water during mixing and placing, before it sets up. A suitable choice for a chemically compatible latex polymer may include a styrene acrylic such as Tykote 2200 from Nacan Polymers (National Starch & Chem.). Advantages of this enhancement to the invention include improvement in the moisture resistance of the foamed composite, and adhesion (especially to high energy surfaces) and flexural strength of the composite. Notably, this is also useful when used in applications where the foaming properties are not necessary or desirable such as in the oil field as noted above, and in similar applications where key benefits flow from its lighter weight, rapid setting time and/or chemical resistance. As well, an advantage of this addition of the latex in the foamed version is that it improves abrasion resistance and compressive strength of the mineral foam. In addition, it serves to improve the thermal resistance of the mineral foam by reducing the permeability of the matrix to airflow, other gases, or moisture in vapour or droplet form. In general, a foaming agent is not employed when the composite is used as a light weight solid such as in a pipe coating where the unique properties are derived from adding the latex polymers.

A further advantage hereof is the potential to cast in place lightweight cellular concrete-type structures without Portland cement. Thus avoided are many problems encountered with the use of Portland cement, including AAC and the AAC process. For example, in embodiments of the present invention embodied as "mineral foam," the very rapid setting properties of the "mineral foam" are such that the materials can be mixed, foamed and set in a few minutes, compared to several hours as in the case with Portland cement and 12 hours for AAC. This accelerated setting can dramatically improve throughput and productivity in a factory setting or on a job site. When used as the core for a stress skin panel, or in combination with light weight galvanized steel studs, the combination of non-combustible mineral foam core and stress skin panel configuration or steel stud wall section brings enhanced functionality, productivity, insulation and non-combustibility to the tilt-up panel or factory-built housing and construction marketplaces.

Thus, broadly stated, an embodiment of the present invention is a composite material comprising a reaction product of reactive materials, for example, a metal oxide, a phosphate, a residual material, a suitable foaming agent, and water. Another embodiment is a rapid setting, lightweight mineral foam material comprising the aforementioned composite material. Another embodiment is a rapid setting, lightweight "mineral foam" material comprising the aforementioned composite material including the addition of a borate or boron compound to slow the setting, allowing more flexibility in handling of the wet slurry and/or mineral foam. Another embodiment is a pre-cast structure comprising the aforementioned composite material. Another embodiment is in-situ structural insulating foam comprising the aforementioned composite material. Another embodiment is a coating comprising the aforementioned composite material. Another embodiment is a lining material for concrete pipe comprising the aforementioned composite material. Another embodiment is an anchor bonding material comprising the aforementioned composite material. Another embodiment is a mix for making a composite material, the mix comprising metal oxide, phosphate, a foaming agent and residual filler material. Another embodiment is a method of making a composite material, which comprises steps of providing a mixture of a metal oxide, phosphate and residual material; adding water to the mixture; and adding a foaming agent to the mixture. Another embodiment is a composite material comprising a reaction product of a magnesium-containing material, phosphate, reactive residual material, a foaming agent and water. Another embodiment is a composite material comprising a reaction product of a magnesium-containing material, phosphate, reactive residual material, a foaming agent, a compatible latex polymer and water. These and other embodiments and aspects of the invention will become even more apparent from the additional description set forth below.

The "mineral foam" composite materials of the present invention can include chemical binders and may also include reactive particulates. The binders and/or reactive particulates may be provided from residual materials. The composite can be considered to be a ceramic/concrete-like material, which may include ionic and/or covalent chemical bonds. The present composite materials may use residual materials such as industrial by-products. Typically, the composite materials have a high tolerance for different types of starting materials, and are relatively insensitive to wide variations in composition and processing techniques.

As can relate to FIG. 1, for example, waste materials such as fly ash, mine tailings, waste metal slurries and/or agricultural fibres are combined with at least one reactive compound and water, followed by addition of a reactive foaming agent, which reacts and foams the matrix as the magnesium oxide/phosphate reaction forms a solid from the wet slurry which formed the feed stock. The acid-base materials chemically react with one another during the composite-formation process.

Suitable reactive materials may contain metal compounds such as metal oxides, metal hydroxides, metal halides, metal carbonates, metal nitrates, metal borates, metal sulphides, metal chromates, metal tungstates, metal molybdates, metal phosphates, metal arsenates, metal vanalydates, metal silicates, and pure metals. Suitable reactive residual materials may contain metal oxides such as MgO, $Al_2O_3$, ZnO, iron oxides, $MnO_2$, $FeTiO_3$, $MgAl_2O_4$, $ZnAl_2O_4$, and (Zn Fe Mn)(Fe Mn)$_2O_4$. Additional oxides include quarry fines, wood ash, dredge materials, kaolin, ground recover glass, foundry sand, red mud, silica fines, coal fines, mine tailings, bauxite, volcanic ash and recycled concrete. As a further example, suitable metal hydroxide-containing reactive residual materials may include Brucite-Mg—Mg (OH)$_2$, Manganite-MnO (OH), Gibbsite-Al(OH)$_3$, Diaspare-AlO—OH, Bachmite-AlO—OH, Geothite-FeO, $Fe_2O_3$—OH and Bauxite. In addition, other types of materials may be used in accordance with the present invention that include minerals such as Carnallite ($KMgCl_3$—$CH_2$), Boracite ($Mg_3ClB_7O_{13}$), Epsomite ($MgSO_4$-$7H_2O$), Newberryite ($MgHPO_4$), Magnesite ($MgCO_3$), Olivine (MgFe)$SiO_4$ and Dolomite (CaMg($CO_3$)$_2$). In addition to the above listed metal-containing reactive compounds, other types of residual materials that may be used in accordance with the present invention include metal slag, calcium-containing dredge (oxides, carbonates, etc.), grain hulls and plant bark fibre. Ocean sand (salt water sand) as a filler and/or salt water, to include sea water, as a solvent may be utilized without significant detrimental effect on the qualities of the "mineral foam" or solid non-foamed composite of the invention.

One type of reactive residual material that may be used in accordance with the present invention comprises ash. Sources of ash materials might include, for example, coal ash, wood ash, municipal solid waste ash (MSW), cellulosic waste ash, collected particles from metal processes involving combustion. Typical sources of ash materials include coal-fired power plants, municipal waste furnaces and coal desulphurisation residuals. Particularly suitable ash materials include trace metal elements and/or metal oxides containing, phosphorous penta oxide, barium oxide, manganese oxide, strontium oxide, potassium oxide, aluminium oxide, iron oxide, titanium oxide, calcium oxide, magnesium oxide and sodium oxide. As a particular example, type C or type F coal ash, or high-carbon fly ash, may be used.

As can relate to FIG. 1 also, in addition to the residual materials, other reactive compounds such as metal oxides and phosphates may be used as starting materials in accordance with the present invention. Some suitable types of reactive compounds include MgO, CaO, ZnO, $TiO_2$, $Al_2O_3$, $SiO_2$, $KH_2(PO)_4$, $Mg(OH)_2$, CaS, iron oxide (e.g., $Fe_2O_3$), $TiCl_4$, $MgSO_4$, $MnO_2$, $SCl_4$, CaCl, $CrCl_3$ and $B_2O_3$.

When phosphate compounds are used as the reactive residual material, the other reactive compounds may include, for example, MgO, iron oxides, $Al_2O_3$ and/or CaO. Some examples of phosphate reactive residual materials include phosphate clays, phosphate slurries, and so forth and the like.

The composite material may include a reaction product of metal oxide, phosphate, reactive residual material mixed with water and the foaming agent(s) and in some application. The amount of metal oxide typically ranges from about 1 to about 90 weight percent, preferably from about 10 to about 50 weight percent, based upon the total weight of the combined metal oxide, phosphate and any reactive residual material. The phosphate typically comprises from about 1 to about 90 weight percent, preferably from about 10 to about 50 weight percent, based upon the total weight of the combined metal oxide, phosphate and any reactive residual material. The residual material typically comprises from about 0.5 to about 85 weight percent, preferably from about 5 to about 80 weight percent, based upon the total weight of the combined metal oxide, phosphate and any reactive residual material. The metal oxide, phosphate and reactive residual material may optionally be mixed with from about 0.1 to about 85 weight percent filler material, preferably from about 0.5 to about 60 weight percent filler material, based upon the total solids content of the metal oxide, phosphate, any reactive residual material and filler. When MgO is used as a metal oxide in accordance with the present invention, it may have a purity of at least 10 weight percent, e.g., from about 50 to about 99 percent, typically should be from about 90 to 98 weight percent. The MgO typically has a particle size of about 1 inch or less. For example, the MgO particles may range from about 0.25 inch to minus 325 mesh or finer. As a particular example, the MgO particles may be minus 200 mesh in order to provide a lightweight matrix in the form of a light weight foam, in liquid form, for example, in the mix, in solid form, for example, as a cured composite. The MgO may have a structure corresponding to its as-mined condition (no heat treatment), or may be light burned, hard burned and/or dead burned. Preferably, the MgO is hard burned or dead burned in order to control the surface reactivity and manage the overall reaction. The characterization of these various grades is covered adequately in the prior art.

The phosphate component of the composite material may comprise mono-potassium phosphate, mono-ammonium phosphate, mono-sodium phosphate, hexa-meta phosphate, di-potassium phosphate, di-hydrogen potassium phosphate, liquid ammonium polyphosphate, liquid mono-ammonium phosphate and/or liquid di-ammonium phosphate. Typical phosphates include mono-potassium phosphate, mono-ammonium phosphate and mono-sodium phosphate. The dry powdered phosphates typically have an average particle size of about 0.5 inch or less. For example, the dry phosphate may have an average particle size of about from 0.25 inch to minus 325 mesh, to include, for example, minus 200 mesh. As an alternative, the phosphates may be derived from liquid ammonium phosphates or polyphosphates. The phosphate may have a purity of at least about 10 percent, to include from about 50 to about 99 weight percent, typically from about 60 to about 95 weight percent, to provide sufficient reaction to produce a light weight composite or mineral foam with adequate structural strength.

The metal oxide and phosphate mixture may comprise a desired weight ratio. For some type of materials, the metal oxide to phosphate weight ratio preferably ranges from about 0.15:1 to about 3:1. For example, where the metal oxide comprises MgO and the phosphate comprises mono-potassium phosphate, the MgO:phosphate weight ratio preferably ranges from about 0.25:1 to about 1.3:1, more preferably from about 0.45:1 to about 1.15:1, for some composite materials.

In addition to the reactive residual material and additional reactive compound(s), the present composite materials are made from a liquid such as water, for example, tap water, potable water, pond water, salt water, sea water, phosphate waste water, and so forth and the like. Although aqueous systems are preferred, other liquids may be used in place of, or in addition to, water, including in the addition of the aforementioned latex polymers where desired. During the mixing process, the liquid, for example, water, typically comprises from about 10 to about 40 weight percent of the mixture, preferably from about 15 to about 25 weight percent. In one embodiment, the reactive material typically comprises from about 15 to about 65 weight percent of the solids content of the mixture, and the additional reactive compound(s) typically comprise from about S to about 45 weight percent of the solids content of the mixture. Note, FIG. 1.

The following table sets forth certain preferred ranges in embodiments with foaming agent as relates to the present invention.

| COMPONENT/CHARACTERISTIC | FORMULA/PROPERTY (% = weight %) |
|---|---|
| Magnesium oxide - Type 1 | 15 to 45% |
| Phosphate compound (−200 Mesh) | 15 to 50% |
| Fly ash - Type C or Type F | 1 to 50% |
| Water and/or latex polymer | 12 to 45% |
| Magnesium oxide - Type 2 (B40) | 1 to 10% |
| Foaming agent | 0.01 to 4% |
| Dry density | 0.45 to 0.85 gram/cc |

The introduction of the foaming agent has a significant impact on the density, volume and the thermal resistance of the resulting composite produced as a consequence. In addition to the above-listed residual materials and reactive compound(s), the solid components of the present composite materials may further comprise materials such as recycled concrete, recovered drywall, waste metal slurries from refining, recycled asphalt, mine tailings and the like. Reactive and/or non-reactive fibres, e.g., metal, polymeric, glass, e-glass, graphite, etc., may also be added to enhance the properties of the finished mineral foam or solid non-foamed composite.

The "mineral foam" composite materials of the present invention may be made by the selection and blending of properly sized reactants with a foaming agent and liquid, for example, potable or non-potable water. During this process, both endothermic and exothermic reactions may take place within the composite mixture. Generally, the composite-forming reaction is exothermic. However, in some cases, at least a portion of the reaction may be endothermic. For example, upon mixing with water, an initial endothermic reaction may take place, followed by an exothermic reaction.

In accordance with the practice of the invention, the composite-forming process may involve relatively short set times. Typical set times in accordance with the present invention are less than about 1 hour, preferably less than about ½ hour. For example, a typical set time of from about 5 to about 30 minutes may be achieved. In contrast, typical set times for Portland cement concrete mixtures require several hours or more.

After the initial set, the composite materials of the present invention may possess favourable engineering properties such as surface hardness, good adhesion to dissimilar materials, rapid setting capability, relatively low density, and the ability to be de-moulded in relatively short timeframes. For example, the composite materials of the invention may have compressive strengths of at least about 100 pounds per square inch (psi) with densities as low as about 0.35 g/cc. Compressive strengths of 500, 2,000, or 3,000 psi, or thereabout, may be achieved, with dry densities that are as low as about ⅓ that of conventional concrete. In some embodiments, compressive strengths of about 6,000 psi or higher may be achieved with densities that are still lower than conventional concrete. In addition to favourable mechanical properties, the present composite materials may possess improved environmental properties such as non-caustic chemistry, use of non-potable water and resistance to corrosive environments.

The "mineral foam" composite materials of the present invention may be used for many different applications. Suitable applications include lighter weight pre-cast structures, in-situ foaming, thermal barriers, and structural composites for use in wall, floor, ceiling panels and blocks, which may be interlocking blocks. Typical in-situ applications include repair of existing concrete materials, e.g., roadways, parking decks, facades, runways, marine applications, vertical columns, grouts, anchor materials, etc. Typical ready mix applications include various types of cast-in-place and pre-cast structures. Typical thermal barrier applications might include insulating foams, underlayments, wall and roof panels or insulting core materials for use in stress skin structural panels and the like. See, e.g., FIGS. 2 and 3.

The following examples further illustrate the invention.

EXAMPLE 1

A most preferred waste composite solid, "concrete-like" composite utilizing fly ash as a filler was prepared as follows:

Mixed were the following at a slow speed with adequate sheer to completely disperse the ingredients to form a homogenous blend:

| Fly ash | 1,000 g |
|---|---|
| 200 mesh MgO | 300 g |
| Liquid M.A.P. fertilizer, grade 10-34-0 (various suppliers) | 600 g |
| Short chopped glass fibre (various suppliers) | 4.0 g |
| Tykote 2200 latex polymer (National Starch) | 60.0 g |
| Drew L4885 defoamer (Drew Chemical) | 1.0 g. |

Upon curing, the resulting composite exhibited a compressive strength of 4,400 psi, a dry density of 1.7 g/cc, a neutral pH, and an open porosity of less than 1% after a 24-hour soak.

EXAMPLE 2

A most preferred "mineral foam" composite, utilizing "sulphur mine tailings" from Gilpin County, Colorado, U.S.A., was prepared as follows:

Mixed were the following at a high speed with adequate sheer to completely disperse the ingredients to form a homogenous blend:

| Liquid M.A.P. fertilizer, grade 10-34-0 | 600 g |
|---|---|
| Powdered boric acid, retarder | 25 g |
| Gilpin County "sulphur tailings" | 400 g |
| Short chopped glass fibre | 2.4 g |
| Tykote 2200 latex polymer | 175 g |
| Water | 75.0 g |
| 200 mesh MgO | 250 g |
| Hydrogen peroxide | 15.0 g. |

Upon curing, the resulting "mineral foam" composite exhibited a compressive strength of 350 psi, and a dry density of 0.57 g/cc.

EXAMPLE 3

A "mineral foam" composite, utilizing "in situ silica fines" from Ajo County, Arizona, U.S.A., was prepared as follows:

Mixed were the following at a high speed with adequate sheer to completely disperse the ingredients to form a homogenous blend:

| Water | 125 g |
|---|---|
| Tykote 2200 latex polymer | 75 g |
| Liquid soap | 5.0 g |
| Ajo County silica fines | 700 g |
| Powdered M.A.P. fertilizer, grade 11-52-0 | 160 g |
| Liquid fertilizer, grade 10-34-0 | 20 g |
| Water | 35.0 g |
| 200 mesh MgO | 45.0 g |
| Bicarbonate of soda, as a foaming agent | 4.0 g. |

Upon curing, the resulting "mineral foam" composite exhibited a compressive strength of 225 psi, and a dry density of 41 lb/cubic foot.

CONCLUSION TO THE DISCLOSURE OF THE INVENTION

The present invention is thus provided. While particular embodiments of this invention have been described above for purposes of illustration, it will be evident to those skilled in the art that numerous variations of the details of the present invention may be made without materially departing from the invention, and while this invention has been described with reference to specific embodiments, it will be recognized by those skilled in the art, that variations are possible without departing from the spirit and scope of the invention, and that it is intended to cover all changes and modifications of the invention disclosed herein for the purposes of illustration, which do not constitute departure from the spirit and scope the invention. Accordingly and/or in addition, various features, parts, steps, subcombinations and combinations can be employed with or without reference to other features, parts, steps subcombinations or combinations in the practice of the invention, and numerous adaptations and modifications can be effected within its spirit, the literal claim scope of which is particularly pointed out as follows:

What is claimed is:

1. A composite material comprising a reaction product of a magnesium oxide; an ammonium phosphate; a residual material; a salt stable latex polymer; and water, wherein the composite material when cured and dry has a density less than about 2.25 g/cc.

2. The composite material of claim 1, wherein the residual material includes a reactive residual material and is selected from the group consisting of $Al_2O_3$, ZnO, an iron oxide, $MnO_2$, $FeTiO_3$, $MgAl_2O_4$, $(ZnFeMn)(FeMn)_2O_4$, quarry fines, a dredge material, kaolin, glass, foundry sand, red mud, silica fines, coal fines, mine tailings, bauxite, recycled concrete, recovered drywall, brucite, manganite, gibbsite, diaspare, bachmite, goethite, carnallite, boracite, epsomite, newberryite, magnasite, olivine, dolomite, metal slag, calcium-containing dredge containing an oxide and/or carbonate of calcium, agricultural fiber, ocean sand, ash, collected particles from metal processes involving combustion, a waste metal slurry, a metal slurry, a metal shaving, graphite, recycled asphalt, and a combination thereof; and the reaction product optionally further is of a retarder selected from the group consisting of boron, a borate, boric acid, and a combination thereof.

3. The composite material of claim 1, wherein the reaction product is foamed and includes that of a foaming agent, which is or includes sodium bicarbonate.

4. The composite material of claim 2, wherein the reaction product is foamed and includes that of a foaming agent, which is or includes sodium bicarbonate.

5. The composite material of claim 1, which is in a form of a rapid setting, lightweight, solid mineral foam material, wherein the density is from about 0.35 to 0.85 g/cc.

6. The composite material of claim 1, which is in a form selected from the group consisting of a pre-cast structure; an in-situ structural insulating foam; a coating; a lining material for a pipe; an anchor bonding material; and a sphere or granule, which can be mixed with a drilling fluid.

7. The composite material of claim 2, which is in a form of a rapid setting, lightweight, solid mineral foam material, wherein the density is from about 0.35 to 0.85 g/cc.

8. The composite material of claim 2, which is in a form selected from the group consisting of a pre-cast structure; an in-situ structural insulating foam; a coating; a lining material for a pipe; an anchor bonding material; and a sphere or granule, which can be mixed with a drilling fluid.

9. The composite material of claim 3, which is in a form of a rapid setting, lightweight, solid mineral foam material, wherein the density is from about 0.35 to 0.85 g/cc.

10. The composite material of claim 4, which is in a form of a lightweight, solid mineral foam material, setting within about 1 hour, wherein the density is from about 0.35 to 0.85 g/cc.

11. The composite material of claim 1, which is acid resistant and has a compressive strength of at least about 500 psi.

12. The composite material of claim 1, wherein, based on total weight of the magnesium oxide, the ammonium phosphate, the residual material, and the water and/or salt stable latex polymer combined, the metal oxide ranges from about 10 to about 50 weight percent; the phosphate ranges from about 10 to about 50 weight percent; the reactive residual material ranges from about 5 to about 80 weight percent; and the water and/or salt stable latex polymer ranges about from 12 to 45 weight percent.

13. The composite material of claim 12, wherein the reaction product is foamed and includes that of a suitable foaming agent, which is or includes sodium bicarbonate; and the composite material, when cured and dry, has a density from about 0.35 to 0.85 g/cc and a compressive strength of at least about 100 psi.

14. The composite material of claim 1, wherein the ammonium phosphate is or includes a fertilizer grade.

15. The composite material of claim 14, wherein the ammonium phosphate is or includes monoammonium phosphate.

16. The composite material of claim 1, wherein the magnesium oxide is or includes hard burned and/or dead burned magnesium oxide(s).

17. The composite material of claim 1, wherein the salt stable latex polymer is or includes a styrene acrylic.

18. The composite material of claim 1, wherein the reaction product has a set time of less than about 1 hour; and the composite material, when cured and dry, has a density about from 0.35 to 1.7 g/cc and a compressive strength of at least about 100 psi.

19. A composite material comprising a reaction product of the following:

| | |
|---|---|
| Magnesium oxide - Type 1 | 15% to 45% by weight |
| Ammonium phosphate compound | 15% to 50% by weight |
| Fly ash - Type C and/or Type F | 1% to 50% by weight |
| Water and/or a salt stable latex polymer | 12% to 45% by weight |
| Magnesium oxide - Type 2 (B40) | 1% to 10% by weight |
| Foaming agent of or including sodium bicarbonate | 0.01% to 4% by weight | wherein the composite material is a mineral foam with a dry density of 0.45 to 0.85 g/cc.

20. The composite material of claim 19, wherein the salt stable latex polymer is present, and is or includes a styrene acrylic.

* * * * *